3,434,836
PROCESS FOR SCREENING A COLOR CATHODE-RAY TUBE
Sam H. Kaplan, Chicago, Ill., assignor to The Rauland Corporation, Chicago, Ill., a corporation of Illinois
No Drawing. Filed May 10, 1965, Ser. No. 454,649
Int. Cl. G03c 5/00
U.S. Cl. 96—36.1 4 Claims

ABSTRACT OF THE DISCLOSURE

The phosphor screen of a color cathode-ray tube is applied by slurry screening techniques. After a particular color phosphor has been applied, and before the application of a second phosphor, the first phosphor deposits are given an overcoat of the same phosphor, a resinous binder and a solvent for the binder. After the application of the overcoat, the screen is washed with a solvent for the binder which removes the overcoat of the first applied phosphor and binder from all areas of the tube other than those elemental areas that are desired to retain the deposits of the first applied phosphor.

The present invention is directed to the process of forming the phosphor screen of a color cathode-ray tube and concerns most particularly minimizing color cross-contamination.

Color cathode-ray tubes of the type under consideration have multi-color screen surfaces comprising interlaced patterns of two or three different series of phosphors, depending upon whether the tube is to be employed in a two or three color system. Each series of phosphors has the same physical configuration, usually being a dot or a stripe. For convenience, it will be assumed that the structure being processed is a three-color tube of the dot triad type. Such a tube is characterized by a screen surface having a myriad of dot triads. Of the three dots in each such triad, one is a phosphor that emits green light in response to electron bombardment, another responds in blue and the third responds in red.

To prepare such a screen, it is usually the practice to cover the entire screen bearing surface with a coating that includes one of the necessary phosphors and to develop on that coating an image related to the desired distribution of the elements of that phosphor over the surface. While this may be accomplished in a number of ways, it is most easily carried out by means of a water soluble photosensitive resist having a solubility proportional to its exposure to actinic light. Two different types of resist are popularly employed; one is said to be positive acting and the other is negative acting. In the former, solubility increases upon exposure to actinic light while the reverse effect takes place in the latter. Either is suitable for screen processing if proper exposure systems are used. If the resist is of the so-called negative acting type, coating the screen with the resist and exposing it thereafter through the shadow mask characteristically associated with the dot-type screen gives rise to separated areas of dot shape throughout the screen surface, designating the several areas to which the color in process is to adhere. Washing the surface in the resist solvent, usually water, then removes the resist from all other portions of the screen. If the resist has been applied with the phosphor in suspension, the necessary distribution of the phosphor into distributed localized areas will have been accomplished. Of course, if the resist is applied and exposed first, the phosphor may thereafter be coated over the exposed resist and subsequent washing with water yields essentially the same pattern of phosphor dots.

This same general technique is used three different times, once for each of the three phosphors required for the tri-color tube. If the green phosphor is applied first, the second phosphor is deposited over the developed green dots and it has been found that developing dots of the second phosphor fails to remove all traces of the second phosphor from the dots that have previously been formed and which are intended to represent green. This is very undesirable both because it tends to reduce the brightness capability of the screen and also adversely affects color purity. This is the difficulty referred to in the art as "cross-contamination" and it may be experienced with respect to the first and to the second series of phosphor dots developed on the tri-color dot-type screen.

A suggestion has previously been made that the first series of phosphor dots developed on the screen be treated by an alkali-metal salt or hydroxide to avoid cross-contamination. Experiences to date, however, in forming the dot pattern from a slurry of a photosensitive resist and phosphor fail to realize any appreciable reduction in cross-contamination with the use of alkali-metal salts or hydroxides.

It has also been suggested that relief from cross-contamination may be attained by repeating, two or more times, the dot forming process using a given phosphor. Experience with this technique indicates that reprocessing increases the thickness of the dots and the phosphor density but does not adequately protect against cross-contamination.

Accordingly, it is a principal object of the invention to provide a method of forming the phosphor screen of a color cathode-ray tube which gives improved relief from the adverse effects of cross-contamination.

It is another particular object of the invention to provide a process for forming the phosphor screen in a color cathode-ray tube which yields screens of improved brightness and purity by minimized cross-contamination.

It is still a further special object of the invention to provide an improved process for forming the phosphor screen of a cathode-ray tube with minimized cross-contamination.

The process of the invention for forming the phosphor screen of a color cathode-ray tube comprises the following steps. There is applied over the entire screen bearing surface of the tube a coating including a phosphor material and a photosensitive resist having a solubility in a predetermined solvent which is proportional to its exposure to actinic light. The coating is dried and then spaced portions of the screen bearing surface are exposed to actinic light to establish, on the basis of differences in solubility in elemental areas of the surface, a predetermined image. An overcoat is applied to the entire screen bearing surface in the form of a suspension or an emulsion of the same phosphor material preferably in a resinous binder and a solvent for that binder. The overcoat is dried and then the surface is washed with the solvent for the resinous binder to remove the phosphor and binder from all portions of the screen bearing surface other than the elemental areas thereof constituting the aforesaid image.

In the preferred practice, the photosensitive resist of the principal coating and the resinous binder of the overcoat are water soluble and the image established through exposure to actinic light need be not developed before the application of the overcoat. In this utilization of the inventive concept, washing the overcoated panel with water both develops the image or pattern of phosphor dots and removes the overcoat completely from all other areas of the screen surface.

The features of the present invention which are believed to be novel are set forth with particularity in the appended claims. The invention together with further objects and advantages thereof may best be understood, however, by reference to the following description.

Color cathode-ray tubes as presently manufactured commercially have a two-piece envelope. One of these is referred to as the cap which structurally is very similar to a flanged dish and the screen bearing surface is the inner portion of the plate surrounded by the flange. The other part has a generally conical or funnel-type appearance with its large end dimensioned to correspond with the flange dimensions of the cap. The small end receives the neck which houses the gun cluster if the tube is of the three-gun variety or a single gun where the tube is intended to utilize but one electron beam. The envelope may be round or rectangular in cross section but these details are of no moment in connection with the screening process of the present invention.

The first step of the process, assuming of course that the faceplate has been properly prepared by a chemical cleansing, is the application over the entire screen bearing surface of the tube cap of a coating including a phosphor material and a photosensitive resist having a solubility in a predetermined solvent which is proportional to a function of its exposure to actinic light. There are a number of ways well known in the art for applying such a coating. For example, the photosensitive resist may first be applied and the phosphor material dusted, settled, sprayed or otherwise deposited thereover. Another popular procedure, and the one which is to be described for purposes of illustration, applies the coating in the form of a slurry. It is very convenient to make use of a negative acting water soluble resist in which case the slurry may be formed of polyvinyl alcohol, the phosphor material which will be assumed to be material that emits green light in response to electron bombardment and a sensitizer which may be ammonium dichromate. These ingredients are prepared in a water solution with or without a wetting agent and/or a dispersing agent. A suitable mix has such ingredients in the following amounts:

| | Grams |
|---|---|
| Polyvinyl alcohol | 33 |
| $Z_nC_dS:A_g$ (green phosphor) | 208 |
| Ammonium dichromate | 6.3 |
| Water | 545 |

This coating is dried by heaters or the like until it is dry to the touch.

Spaced portions of the slurry coated screen-bearing surface are then exposed to actinic light to establish, on the basis of differences in solubility of elemental areas of the coated surface, a predetermined image. This exposure, as is well understood in the art, takes place in what is known as a lighthouse in which a mercury arc lamp directs light to the slurry coat through the shadow mask of the tube in process. Where the slurry is the negative acting type, as assumed heretofore, the solubility of the resist is inversely proportional to the light exposure, the exposure causes a multiplicity of separated dots or round elemental areas of the coated screen to become insoluble in water. The other unexposed areas, however, remain highly soluble in water and, therefore, the exposed surface represents an image or pattern of green dots that is to be developed. The exposed tube cap is now removed from the lighthouse and subjected to a water rinse in order to develop this image or pattern of green phosphor dots. Rinsing the screen surface of the tube with water washes the surface clean of phosphor and resist except for the pattern of green dots. The developed screen is now dried once more. While it need not be as completely dried as required before exposure, it should be at least partially dried to a condition in which there is no free liquid on the screen.

In the next step, an overcoat is applied over the entire screen bearing surface of the tube, the overcoat being a suspension or an emulsion of the same phosphor, a resinous binder and a solvent for that binder. Continuing on the assumption that water soluble resins are employed, since this is a most practical adaptation of the invention, the resinous binder which need not be light sensitive may be polyvinyl alcohol or other water soluble colloid such as gelatin, gum arabic, albumen or the like.

Most conveniently, the overcoat may be a second application of the phosphor material and photosensitive resist used in the first slurry coat but now preferably being less viscous or being a less concentrated solution of the first coating composition. It is easily attained by increasing the water content of the slurry. By way of example, the green slurry usually has a viscosity of 35 centipoise whereas the viscosity of the overcoat, when a less concentrated slurry is used for that purpose, is in the range of 10–15. The overcoat, because of its own water content, tends to soften the previously formed dots of green phosphor so that the phosphor material of the overcoat adheres to these dots increasing the phosphor density thereof. The overcoat is then dried to the same extent that the first slurry coat was dried before exposure and finally the screen surface is washed with the solvent of the resinous binder in the overcoat to remove the phosphor and binder of the overcoat from all portions of the screen bearing surface other than the elemental areas thereof which constitute the previously developed phosphor image. More particularly, for the assumed process, the screen surface is washed with water to remove all of the overcoat except the portions thereof which overlie and adhere to the previously formed green phosphor dots. Thereafter, the screen is dried again and the dots of the next color are established through a repetition of the same general process steps. Usually, blue phosphor is applied after the green and, following the establishing of the blue phosphor dots, the red phosphor dots are formed in the same way except there is no need to overcoat the red or the last applied phosphor.

A screen formed by the described process is materially improved in respect of cross-contamination as compared with screens formed with other processes heretofore known in the art. It is important to observe that there is no second exposure in the complete processing of the screen for a single color phosphor. That is to say, the overcoat is not exposed and this distinguishes sharply from prior practices of the art in which phosphor is applied, exposed and developed repeatedly in forming dots of a given color phosphor. This difference is most meaningful.

If the overcoat were to be exposed, the top of the dots on the screen would still represent a free resin surface to which the next color phosphor applied to the screen surface could adhere and give rise to cross-contamination. By avoiding exposure of the overcoat, the overcoat is washed off except for the phosphor content which adheres to what previously was the free resin surface of the dots after their development. As a consequence, the phosphor density of the dots is increased which enhances brightness. Moreover, since the resinous binder of the overcoat has been washed off the top surface of the previously formed dots, the overcoat itself does not represent a free resin surface to which other phosphors would have a tendency to adhere. Therefore, there is much less possibility of cross-contamination which also adds to increased brightness if one understands that screen brightness represents conversion of the impinging electrons into light energy. Where there are cross contaminants, the undesired phosphors are closer to the electron gun than the phosphors representing the color intended for a particular phosphor dot under consideration. For this reason, the contaminating phosphor particles waste the energy that they absorb from the beam; waste in the sense that they do not contribute to the desired color field. Minimizing such contaminant will, as a consequence, further enhance brightness as well as improving the color of the field in question.

The foregoing description is predicated on the use of water soluble resins in both the base coat which forms the phosphor dots and the overcoat. This is not a necessary limitation to the invention although it is the most attractive for present day tube manufacture. One may practice the invention by using a photosensitive resist that is soluble in a particular solvent and using a resinous binder in the overcoat which is soluble in a different solvent. In this case, the phosphor dots are developed by the solvent appropriate to the photosensitive resist and the overcoat is washed in a solvent selected with particular regard to the solubility of its resinous binder. It is apparent from cursory consideration that the use of materials in the overcoat which yield to a common solvent is more desirable, especially if water is used as this is a very economical procedure. Actually, the resin in the overcoat can be eliminated although better results are attained if it is present.

The advantage of a common solvent is especially pronounced in a most attractive embodiment of the invention in which the phosphor dots are not separately developed. The process described in detail above may be modified by omitting the discrete developing step and by washing the overcoat in an appropriate solvent to remove the soluble portions of the first applied coat as required to develop the phosphor dots and to concurrently remove the phosphor material and resinous binder of the overcoat from all portions of the screen other than the portions representing the phosphor dots. Of course, if the photoresist of the first coat and the resinous binder of the overcoat are soluble in different solvents, this modification of the process requires that the wash material be one which can dissolve both the photosensitive resist and the resinous material of the overcoat. Clearly, most attractive results are derived from employing a photosensitive resist in the principal coat and a resinous binder in the overcoat which are soluble in the same solvent, preferably, water. Where such materials are utilized, washing with water after the application and drying of the overcoat may develop the phosphor dots with their protective overcoat and otherwise strip the rest of the screen bearing surface of both the undercoat and the overcoat.

The overcoat need not be spun coated; it may if desired be applied by spraying or other means. However, the suspending medium must be capable of slightly softening the resinous surface of the phosphor dot image so that the overcoated phosphor is able readily to adhere to the top of the dot when dried.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. The process of forming the phosphor screen of a color cathode-ray tube which comprises the following steps:

applying over the entire screen bearing surface of said tube a coating including a phosphor material and a photosensitive material having a solubility in a predetermined solvent which is a function of its exposure to actinic light;

drying said coating;

exposing spaced portions of said surface to actinic light to establish, on the basis of differences in solubility of elemental areas of said surface, a predetermined image;

applying over the entire screen bearing surface an overcoat of said phosphor material, a resinous binder and a solvent for said binder;

drying said overcoat;

and washing said surface with said solvent for said resinous binder, without further exposure to actinic light, to remove said phosphor and said binder from all portions of said surface other than the elemental areas thereof constituting said image.

2. The process of forming the phosphor screen of a color cathode-ray tube which comprises the following steps:

applying over the entire screen bearing surface of said tube a coating including a phosphor material and a photosensitive material having a solubility in a predetermined solvent which is a function of its exposure to actinic light;

drying said coating;

exposing spaced portions of said surface to actinic light to establish, on the basis of differences in solubility of elemental areas of said surface, a predetermined image;

treating said surface with said solvent to remove the most soluble ones of said elemental areas to develop said image;

at least partially drying said surface to remove free liquid therefrom;

applying over the entire screen bearing surface an overcoat of said phosphor material, a resinous binder and a solvent for said binder;

drying said overcoat;

and washing said surface with said solvent for said resinous binder, without further exposure to actinic light, to remove said phosphor and said binder from all portions of said surface other than the elemental areas thereof constituting said image.

3. The process of forming the phosphor screen of a color cathode-ray tube which comprises the following steps:

applying over the entire screen bearing surface of said tube a coating including a phosphor material and a photosensitive material having a solubility in a predetermined solvent which is a function of its exposure to actinic light;

drying said coating;

exposing spaced portions of said surface to actinic light to establish, on the basis of differences in solubility of elemental areas of said surface, a predetermined image;

applying over the entire exposed screen bearing surface an overcoat of said phosphor material, a resinous binder and a solvent for said binder;

drying said overcoat;

and washing said surface with a solvent for both said photosensitive material and said resinous binder, without further exposure to actinic light, to remove the most soluble ones of said elemental areas to develop said image and concurrently to remove said phosphor and said binder from all portions of said surface other than the elemental areas thereof constituting said image.

4. The process of forming the phosphor screen of a color cathode-ray tube which comprises the following steps:

applying over the entire screen bearing surface of said tube a coating including a phosphor material and a photosensitive material having a solubility in a predetermined solvent which is a function of its exposure to actinic light;

drying said coating;

exposing spaced portions of said surface to actinic light to establish, on the basis of differences in solubility of elemental areas of said surface, a predetermined image;

applying over the entire screen bearing surface as an overcoat a second application of said phosphor material and said photosensitive material;

drying said overcoat;

and washing said surface with said solvent, without further exposure to actinic light, to remove said phosphor and said binder from all portions of said surface other than the elemental areas thereof constituting said image.

References Cited

UNITED STATES PATENTS

| | | | |
|---|---|---|---|
| 2,837,429 | 6/1958 | Whiting | 96—36.1 |
| 2,992,919 | 7/1961 | Beeler et al. | 96—36.1 |
| 3,005,708 | 10/1961 | Hesse | 96—36.1 |
| 3,054,672 | 9/1962 | Angelucci | 96—36.1 |
| 3,067,055 | 12/1962 | Saulnier. | |
| 3,152,900 | 10/1964 | Kaus et al. | 96—36.1 |
| 3,317,319 | 5/1967 | Mayaud | 96—36.1 |

NORMAN G. TORCHIN, *Primary Examiner.*

C. BOWERS, *Assistant Examiner.*